Sept. 6, 1966 F. M. GARDNER 3,271,697

MULTIVIBRATOR WITH STARTING CIRCUIT

Filed May 7, 1965

INVENTOR.
FLOYD M. GARDNER

BY Harry A. Herbert Jr. and
Sherman H. Goldman

ATTORNEYS 3,271,697
Patented Sept. 6, 1966

3,271,697
MULTIVIBRATOR WITH STARTING CIRCUIT

Floyd M. Gardner, Reseda, Calif., assignor to the United States of America as represented by the Secretary of the Air Force Filed May 7, 1965, Ser. No. 454,226
1 Claim. (Cl. 331—113)

This invention relates to a multivibrator circuit, and more particularly to a non-saturating multivibrator circuit which provides more reliable starting than any previously known.

In many multivibrator circuits utilized where a free-running oscillator with square wave output is required, a problem arises with regard to starting reliability. In such a circuit, using transistors, during normal operation one transistor is cut off while the other is saturated. When the circuit is first turned on, however, it is possible for both transistors to become saturated and remain in that state. The circuit in this condition would not regenerate, and consequently oscillations would not begin.

Obviously, then, any circuit that corrects this failure must prevent simultaneous saturation of both transistors and maintain a regenerative condition to cause switching and promote oscillations. It is, therefore, an object of this invention to provide a new and more reliable multivibrator circuit.

It is a further object of this invention to provide a novel transistorized multivibrator circuit which prevents transistor saturation.

It is another object of this invention to provide a multivibrator circuit which will maintain a regenerative condition to cause switching.

It is still another object of this invention to provide a novel method to insure the starting of a multivibrator.

These and other advantages, features and objects of the invention will become more apparent from the following description taken in connection with the illustrative embodiment in the accompanying drawings wherein.

Figure 1:
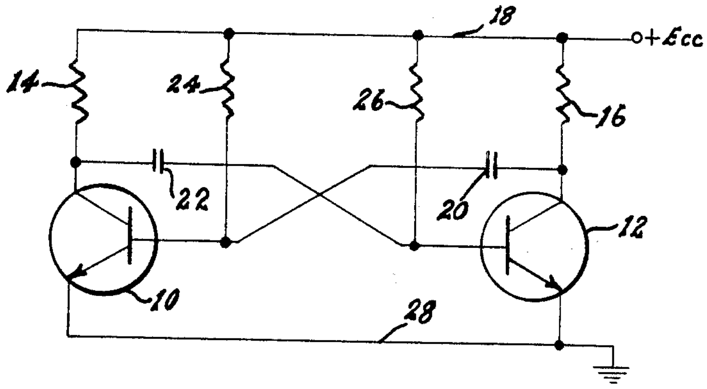
FIG. 1 represents a common multivibrator circuit.

As mentioned, the starting reliability of some multivibrator circuits is poor, and as a result of this, systems needing starting reliability must constantly be maintained in the "ON" or operating mode. This presents only a negligible problem where the power supply is unlimited; however, where the system is operated on a limited power supply, such as a battery supply, it is imperative that electrical power be conserved whenever possible. Consequently, the system must be shut down when not in use.

The lack of starting reliability is explained with reference to the multivibrator circuit of FIG. 1 wherein the two transistors 10 and 12 are connected through the collector resistors 14 and 16 to a positive voltage supply $E_{cc}$ by means of the conductor 18. The collector of transistor 12 is connected through a capacitor 20 to the base of transistor 10 and the collector of transistor 10 is likewise connected through capacitor 22 to the base of transistor 12. The leak resistors 24 and 26 allow the capacitors 20 and 22 to discharge to the positive source $E_{cc}$ through conductor 18. The emitters of the transistors are connected to ground via conductor 28.

The frequency of the oscillations of this circuit are governed by the leak resistors 24 and 26 and the capacitors 22 and 20. The power output is determined by the resistors 14 and 16 and the voltage supply $E_{cc}$.

In normal operation, one transistor is cut off while the other is saturated. Cut-off is maintained by a charge on the appropriate capacitor. The capacitor will discharge through its leak resistor and when a determined point is reached, the "OFF" or non-conducting transistor will begin to conduct. At this point the circuit becomes regenerative and switches over to its opposite state and repeats its cycle.

When first turned on, however, it is entirely possible for both transistors to become saturated. Since a transistor has no incremental gain in its saturated condition there would be no gain around the feedback loop, and as a result the circuit would not regenerate and oscillations would not start. The net result is that the transistors would merely remain in the saturated state and the circuit inoperative.

Figure 2:
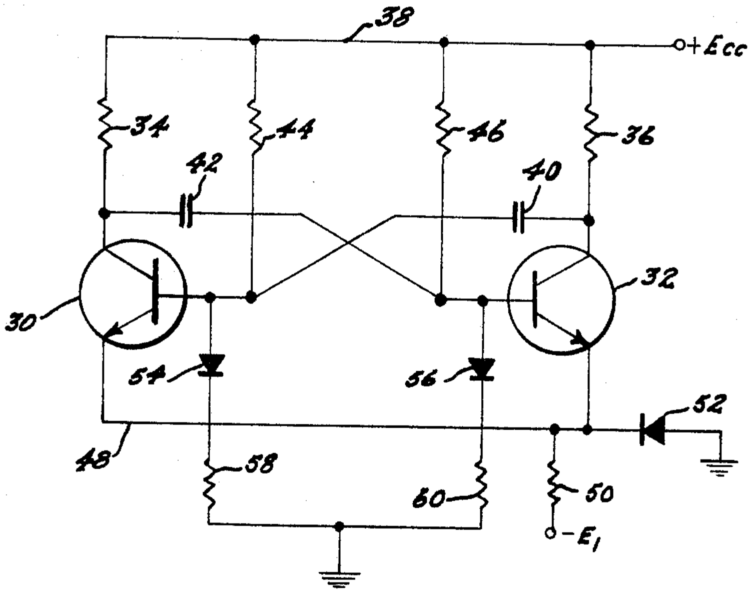
FIG. 2 represents other multivibrator circuits accordto this invention.

With regard to the improved circuit shown in FIG. 2, there is shown the circuit of FIG. 1 identified by Nos. 30–48 inclusive. The circuit as improved will have no appreciable effect upon normal circuit behavior when the values of the resistor 50 and the voltage of $E_1$ are chosen such that diode 52 will conduct current somewhat less than the emitter current of the "ON" transistor. The emitters are thereby clamped to ground. The diodes 54 and 56 are chosen so that they are non-conducting with the normal base voltage needed to turn "ON." The transistors and the circuit will then operate as the circuit shown in FIG. 1.

In the situation where the circuit is turned on and both transistors attempt to turn "ON" simultaneously, the current through the resistor 50 is effectively limited so that extra current for one of the transistors must be taken from the diode 52. Actually, all the current from diode 52 will be taken, the diode will turn off and the transistor emitters will begin to rise toward a positive potential.

The diodes 54 and 56 prevent the emitter potential from rising and the collector potential from falling until the two meet and the transistors become saturated. With the diodes (54 and 56) if the emitter potential rises, the bases will attempt to do the same and the diodes (54 and 56) will begin to conduct and prevent the base potential from rising by any substantial amount. The emitter potential, which cannot rise above the base, in either transistor, is then effectively clamped to a voltage only slightly higher than normal.

Under these conditions the resistor 50 cannot supply enough current to saturate both transistors, so there must be gain in at least one transistor.

The resistors 58 and 60 are selected so that the diodes 54 and 56 do not cause a short circuit for signal currents, since any current fluctuation must reach the base of the transistor without excessive attenuation.

When the transistors are unsaturated and have their normal gain, without excessive attenuation caused by the diodes 54 and 56, there is provided adequate gain around the feedback loop, the circuit will regenerate and switch leaving one transistor in the "ON" condition and the other in the "OFF" condition.

It has been thus shown, that by limiting the current to the emitters by the addition of diode 52, it is possible to prevent saturation to provide a reliable starting multivibrator circuit.

What is claimed is:

A multivibrator circuit comprising: a pair of transistors having a capacitive coupling between the collector of one transistor and the base of the other transistor; a first and second diode and a corresponding first and second resistance, individually serially connected to the base of the two transistors and to a point of steady potential whereby the base potential is not permitted to rise significantly above the potential of said point of steady potential; a third resistor common to the emitters of the two transistors and connecting them to a second steady potential which is negative with respect to said first point of steady potential and producing part of the emitter current; a third diode common to the emitters of the two transistors and connected to said first point of steady potential and producing the remainder of the emitter current, said third diode being so selected that when the circuit is initially activated it will stop conducting and the transistor emitters will begin to rise toward a positive potential preventing saturation thereof.

No references cited.

ROY LAKE, *Primary Examiner.*

J. KOMINSKI, *Assistant Examiner.*